United States Patent [19]
Barbieux

[11] Patent Number: 6,036,197
[45] Date of Patent: Mar. 14, 2000

[54] DEVICE FOR CLAMPING AND DRIVING A PRE-POSITIONED WORK PIECE

[75] Inventor: Jacques Barbieux, Louvres, France

[73] Assignee: Sandvik Tobler S.A., Louvres, France

[21] Appl. No.: 09/145,283

[22] Filed: Sep. 2, 1998

[30] Foreign Application Priority Data

Sep. 9, 1997 [FR] France .................................. 97 11156

[51] Int. Cl.[7] ................................................ B23B 31/18
[52] U.S. Cl. .......................... 279/132; 279/106; 279/133; 279/137
[58] Field of Search .................... 279/106, 107, 279/108, 132, 133, 137

[56] References Cited

U.S. PATENT DOCUMENTS

| 2,494,166 | 1/1950 | Drissner | 279/132 |
|---|---|---|---|
| 4,465,289 | 8/1984 | Banks | 279/106 |
| 5,605,343 | 2/1997 | Barbieux | 279/132 |

FOREIGN PATENT DOCUMENTS

| 60-207705 | 10/1985 | European Pat. Off. . | |
|---|---|---|---|
| 2 248 901 | 5/1975 | France . | |
| 2 373 351 | 7/1978 | France . | |
| 401058403 | 3/1989 | Japan | 279/107 |
| 401199709 | 8/1989 | Japan | 279/132 |
| 785916 | 11/1957 | United Kingdom | 279/132 |

Primary Examiner—Steven C. Bishop
Attorney, Agent, or Firm—Burns, Doane, Swecker & Mathis, L.L.P.

[57] ABSTRACT

Clamping is ensured by at least two pivoting arms one end of which co-operates with a half draw member (10a, 10b) via a link having a truncated sphere (19) and an inclined plane (10). The draw member is mounted coaxially outside a locking ring (9) displaceable through the action of a traction rod (5). The system of transmission between the ring and the draw member is provided with compensating and locking means constituted by a guide (11), a compensating disk (13) and an adjusting member (14) co-operating with an oblique face of the compensating disk.

6 Claims, 2 Drawing Sheets

...

DEVICE FOR CLAMPING AND DRIVING A PRE-POSITIONED WORK PIECE

BACKGROUND OF THE INVENTION

1. Field of the Invention

The system for clamping and driving a work piece according to the invention relates, more precisely, to a work piece pre-positioned, in particular, on a mandrel or expandable centring means, the said system not affecting the initial position of the work piece in relation to its support.

2. Description of the Related Art

A number of work piece clamping devices are known, for example chucks for radial and axial clamping, but without compensated clamping, or again, chucks with one or more concentric or diameter compensated jaws, for radial clamping, with or without axial clamping, with modifiable distribution between radial clamping and axial clamping with compensation of the said clamping and distribution of the clamping force practically equal on each jaw, as disclosed in document FR-A 2373 351.

More recently, these systems have been modified by producing a clamping chuck permitting more accurate radial guiding of the jaw holders in the body of the chuck, which also ensures that they are free to pivot axially with a view to optimum positioning of the jaws in contact with the work piece for clamping. For this purpose, each jaw holder is equipped with a member guided along a groove provided in the chuck, the said guide member being free solely to pivot axially in relation to the jaw holder, as disclosed in document U.S. Pat. No. 5,605,343 in the name of the Applicant.

However, there are cases in which the said devices cannot be entirely suitable, such as, for example, for a work piece pre-positioned on an expandable centring means and that one would like to be able to clamp without thereby changing the said pre-positioning. It is sometimes advisable, in fact, in the case, for example of an internally threaded hollow work piece, the thread of which bears against a centring support, not to cause the said work piece, when it is clamped, to be displaced in relation to the support, which could be detrimental to the said work piece, for example by blunting or damaging its thread.

SUMMARY OF THE INVENTION

The invention provides a solution to this problem by combining, in one and the same tool, a compensation system and a floating clamping member having at least two arms.

The invention thus relates to a device for clamping and driving a work piece pre-positioned on a centring means, the device comprising a main body, a traction rod sliding axially in the said body, which, through a transmission system, converts its axial movement into a radial movement of the members ensuring the clamping of the work piece, the device being characterised in that the clamping is ensured by at least two pivoting arms one end of which co-operates with a half draw member via a link having a truncated sphere and an inclined plane, each half draw member being mounted coaxially outside a locking ring displaceable through the action of the traction rod, and the transmission system between the ring and the draw member being provided with compensating and locking means.

According to one particular characteristic of the invention, the compensation and locking means are constituted by a guide coaxial with the traction rod and housed inside the locking ring, by a compensating disk bearing against the guide, and by an adjusting member co-operating with an oblique face of the compensating disk, in abutment against an inner shoulder or edge of the half draw member.

According to another particular characteristic of the invention, each half draw member bears a lateral wing pierced by a window the edge of which forms the inclined plane on which the flat face of the truncated sphere comes to bear.

BRIEF DESCRIPTION OF THE DRAWINGS

Further characteristics and advantages of the invention will emerge from the following description of an exemplary form of embodiment, wherein reference is made to the annexed drawings, which show.

DETAILED DESCRIPTION OF THE INVENTION

Figure 1:
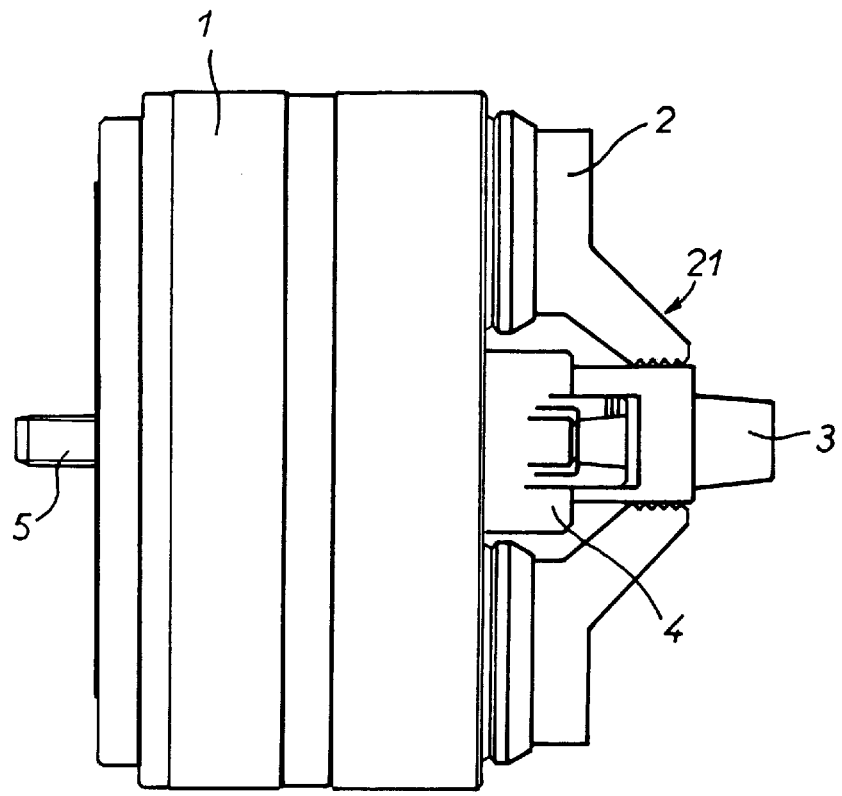
FIG. 1, an overall elevation view of the main body of the clamping device.

In FIG. 1 can be seen the cylindrical support 1, or main body, equipped with two clamping arms, the jaws 21 of which are designed to clamp a work piece 3, in this case a hollow cylindrical piece provided with an internal thread, which is placed over an expandable centring means 4, on which it is prepositioned, the said expandable centring means being mounted on the pin of the support; a traction rod 5 can be seen on the other side.

Figure 2:
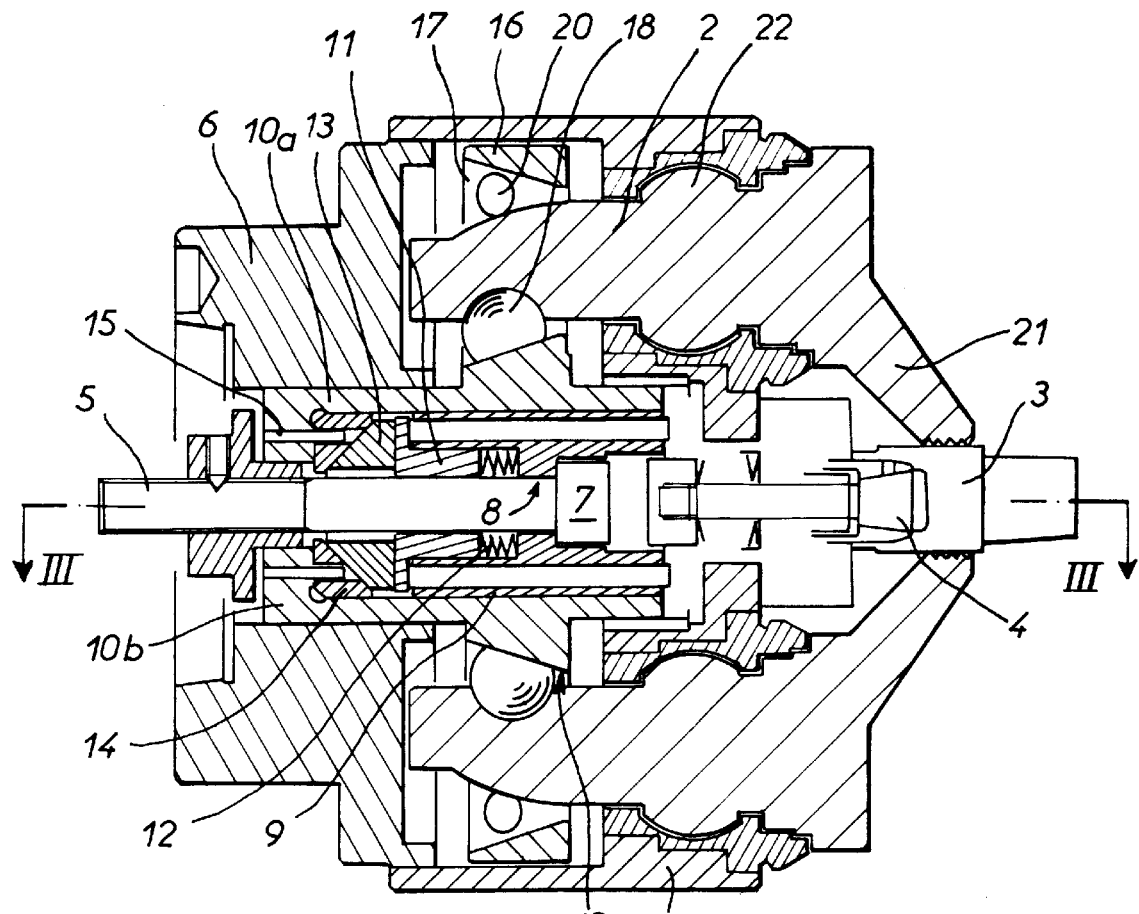
FIG. 2, a vertical cross-sectional view of the main body.
Figure 3:
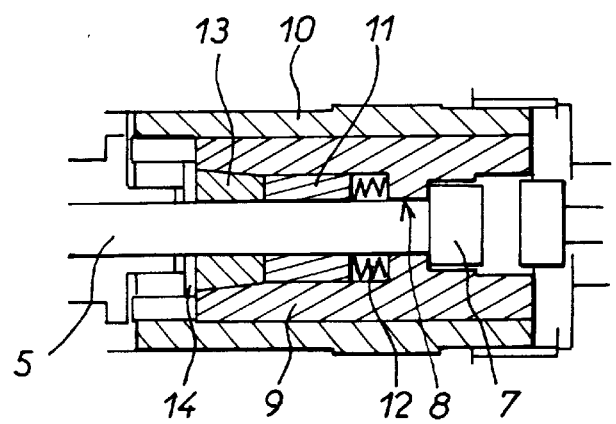
FIG. 3, a view in partial cross-section along line IIII–III of FIG. 2.

FIGS. 2 and 3 show more precisely how the system for clamping and driving work piece 3 is designed.

At the rear of main body 1 is fixed a plate 6 in which traction rod 5 is able to slide axially. The rod ends in a stop 7 bearing against an inner shoulder 8 of a cylindrical locking ring 9, which is itself axially displaceable inside two cylindrical half draw members 10a and 10b. A guide 11, coaxial with traction rod 5, is housed inside ring 9, and a circular spring 12 is intercalated between the guide and shoulder 8 of the ring. A compensating disk 13 bears against guide 11 and, on the opposite side, its oblique face co-operates with an adjusting member 14 in abutment against an inner edge or shoulder of a half draw member 10a, 10b. Pins 15 are used to secure the adjusting member and the half draw member.

Each half draw member 10a, 10b, sliding axially inside main body 1, bears a lateral wing 16 opposite that of the other half draw member, each pierced by a window 17 the edge of which is inclined, with the pivoting clamping arm 2 passing through the said window. The lower part of the arm is profiled so as to mate with the contour of a truncated sphere 18, the flat face of which bears against inclined plane 19 formed by the edge of window 17. The upper part of the clamping arm has a rounded portion bearing against a pin, 20, transverse to the opening of the window. Arm 2 is thus held between sphere 18 and the said pin, and it is capable of pivoting inside the main body, thanks to the ball joints 22 with which it is equipped, to the rear of clamping jaws 21.

Figure 4:
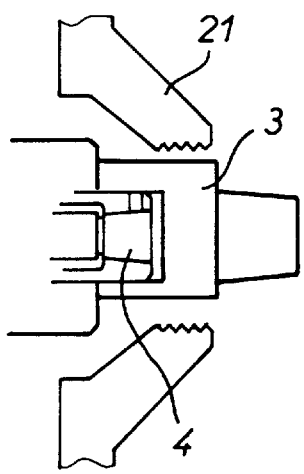
FIGS. 4 to 6, schematic views showing the initial phases of positioning and of clamping of the work piece by the jaws of the pivoting arms.
Figure 5:
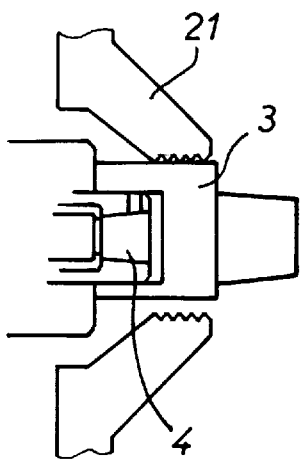
Figure 6:
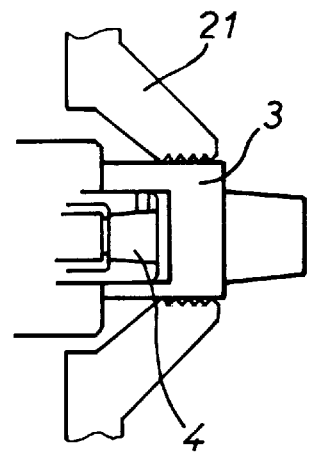

The positioning and clamping sequences are illustrated in FIGS. 4 to 6.

FIG. 4 shows work piece 3 pre-positioned on centring means 4, jaws 21 being open.

When traction is applied to rod 5 (to the left in FIGS. 2 and 3) its stop 7, via shoulder 8, tends to move locking ring 9 against spring 12 acting on guide 11, then compensating disk 13, adjusting member 14 and, finally, half draw member 10a, 10b. The independent leftwards movement of each of half draw members 10a, 10b is communicated to inclined planes 19, and spheres 18 cause arms 2 to swing, which arms pivot on their ball joints 22 to position jaws 21 on work piece 3.

It can be seen from FIG. 5 that, owing to the inaccurately centred pre-positioning of the work piece on centring means 4, one of the jaws has come into contact with the work piece before the other. During this phase, the clamping force is low to avoid displacing the pre-positioned work piece. Owing to the inclined planes of compensating disk 13 and to its bevelled outer profile, visible in FIG. 3, the disk has penetrated ring 9, in which it has become radially locked. We thus have compensated clamping with locking in position.

With the compensation system thus locked, finally clamping of jaws 21 onto work piece 3 can be carried out, as shown in FIG. 6, by continuing to act upon the traction rod, clamping being ensured with identical travel and force.

I claim:

1. A device for clamping and driving a work piece pre-positioned on a centering means, the device comprising a main body, a traction rod sliding axially in the said body, which, through a transmission system, converts its axial movement into a radial movement of members ensuring the clamping of the work piece, which is ensured by at least two pivoting arms and a link having a truncated sphere and an inclined plane, wherein the end of each pivoting arm co-operates with a half draw member via the link with the truncated sphere, in that each half draw member is mounted coaxially outside a locking ring displaceable through the action of the traction rod, and in that the transmission system between the ring and the draw member is provided with compensating and locking means.

2. The clamping and driving device according to claim 1, wherein the compensation and locking means are constituted by a guide coaxial with the traction rod and housed inside the locking ring, by a compensating disk bearing against the guide, and by an adjusting member co-operating with an oblique face of the compensating disk, in abutment against an inner shoulder of the half draw member.

3. The clamping and driving device according to claim 1, wherein a spring is intercalated between a guide and a shoulder of the locking ring.

4. The clamping and driving device according to claim 1, wherein each half draw member bears a lateral wing pierced by a window, the border of which forms the inclined plane.

5. A device for clamping and driving a work piece pre-positioned on a centering means, the device comprising:
   a main body;
   a traction rod sliding axially in said body, which, through a transmission system, converts its axial movement into a radial movement of members ensuring the clamping of the work piece, which is ensured by at least two pivoting arms and a link having a truncated sphere and an inclined plane, wherein the end of each pivoting arm co-operates with a half draw member via the link with the truncated sphere, in that each half draw member is mounted coaxially outside a locking ring displaceable through the action of the traction rod, and in that the transmission system between the ring and the draw member is provided with compensating and locking means, the compensating and locking means being constituted by a guide coaxial with a traction rod and housed inside the locking ring, by a compensating disk bearing against the guide, and by an adjusting member cooperating with an oblique face of the compensating disk, in abutment against an inner shoulder of the half draw member.

6. A device for clamping and driving a work piece pre-positioned on a centering means, the device comprising:
   a main body;
   a traction rod sliding axially in said body, which, through a transmission system, converts its axial movement into a radial movement of members ensuring the clamping of the work piece, which is ensured by at least two pivoting arms and a link having a truncated sphere and an inclined plane, wherein the end of each pivoting arm co-operates with a half draw member via the link with the truncated sphere, in that each half draw member is mounted coaxially outside a locking ring displaceable through the action of the traction rod, and in that the transmission system between the ring and the draw member is provided with compensating and locking means; and
   a spring intercalated between a guide and a shoulder of the locking ring.

* * * * *